United States Patent
Koyama

(10) Patent No.: US 7,573,016 B2
(45) Date of Patent: Aug. 11, 2009

(54) AMPLIFICATION TYPE SOLID-STATE IMAGING DEVICE

(75) Inventor: Eiji Koyama, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 711 days.

(21) Appl. No.: 11/405,752

(22) Filed: Apr. 18, 2006

(65) Prior Publication Data
US 2006/0237631 A1   Oct. 26, 2006

(30) Foreign Application Priority Data
Apr. 20, 2005   (JP) .............................. 2005-122202

(51) Int. Cl.
*H03F 3/08* (2006.01)
(52) U.S. Cl. .................. 250/214 A; 348/302; 348/308; 348/297; 257/271; 257/291; 257/292; 250/208.1
(58) Field of Classification Search ................. 250/214, 250/208.1; 348/302, 308, 297; 257/271, 257/291, 292
See application file for complete search history.

(56) References Cited

U.S. PATENT DOCUMENTS

| 5,322,994 | A | * | 6/1994 | Uno ........................ 250/208.1 |
| 5,955,753 | A | | 9/1999 | Takahashi |
| 6,091,449 | A | | 7/2000 | Matsunaga et al. |
| 6,650,369 | B2 | | 11/2003 | Koizumi et al. |
| 7,268,331 | B2 | | 9/2007 | Koyama et al. |

2006/0232580 A1 * 10/2006 Koyama ..................... 345/211

FOREIGN PATENT DOCUMENTS

| JP | H05-207375 A | 8/1993 |
| JP | H05-207376 A | 8/1993 |
| JP | 9-46596 | 2/1997 |
| JP | H11-112018 A | 4/1999 |
| JP | 2005-005911 A | 1/2005 |
| WO | WO-97/07630 | 2/1997 |

* cited by examiner

*Primary Examiner*—Jason Chan
*Assistant Examiner*—Yih-Sien Kao
(74) *Attorney, Agent, or Firm*—Edwards Angell Palmer & Dodge LLP; David G. Conlin; Peter J. Manus

(57) ABSTRACT

In the amplification type solid-state imaging device of the present invention, the input side of a switched capacitor amplifier portion 20 is connected to the output side of each transfer transistor 2 of a photoelectric conversion and transfer portion group obtained by grouping a plurality of photoelectric conversion and transfer portions 10 having a photodiode 1 and a transfer transistor 2, and the output side of the switched capacitor amplifier portion 20 is connected to a vertical signal line 9. The switched capacitor amplifier portion 20 has a signal charge storage portion 8, an amplification transistor 3 whose input side is connected to the signal charge storage portion 8, and a capacitor 6 and a reset transistor 5 connected between the input and output of the amplification transistor 3. By controlling the reset transistor 5 and a switchover portion 12 by a control section 25, the input side voltage of the inverting amplifier constructed of the amplification transistor 3 and the constant current load transistor 4 is controlled. According to the device, a high-quantity image can be obtained, and the pixel size can be reduced.

9 Claims, 9 Drawing Sheets

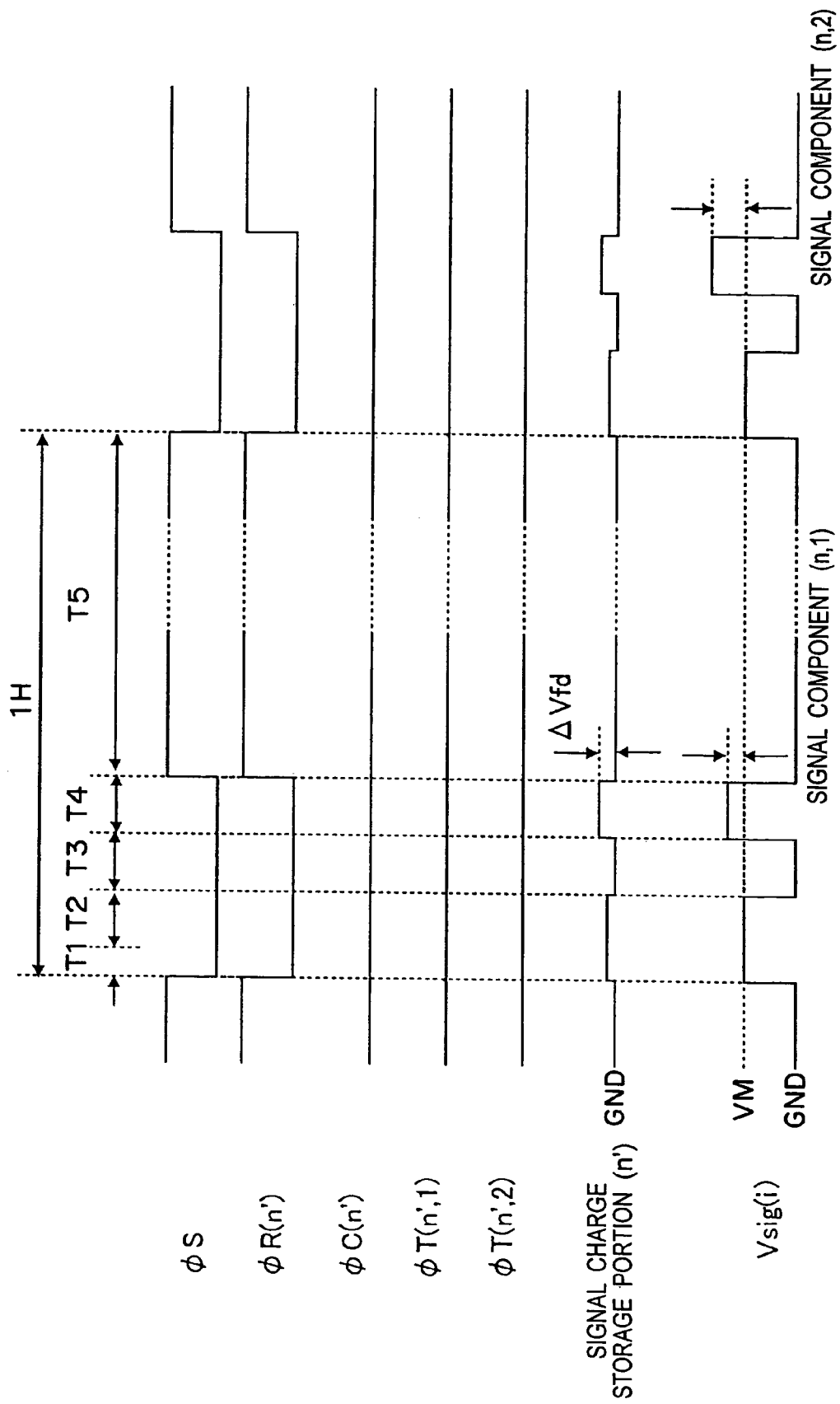

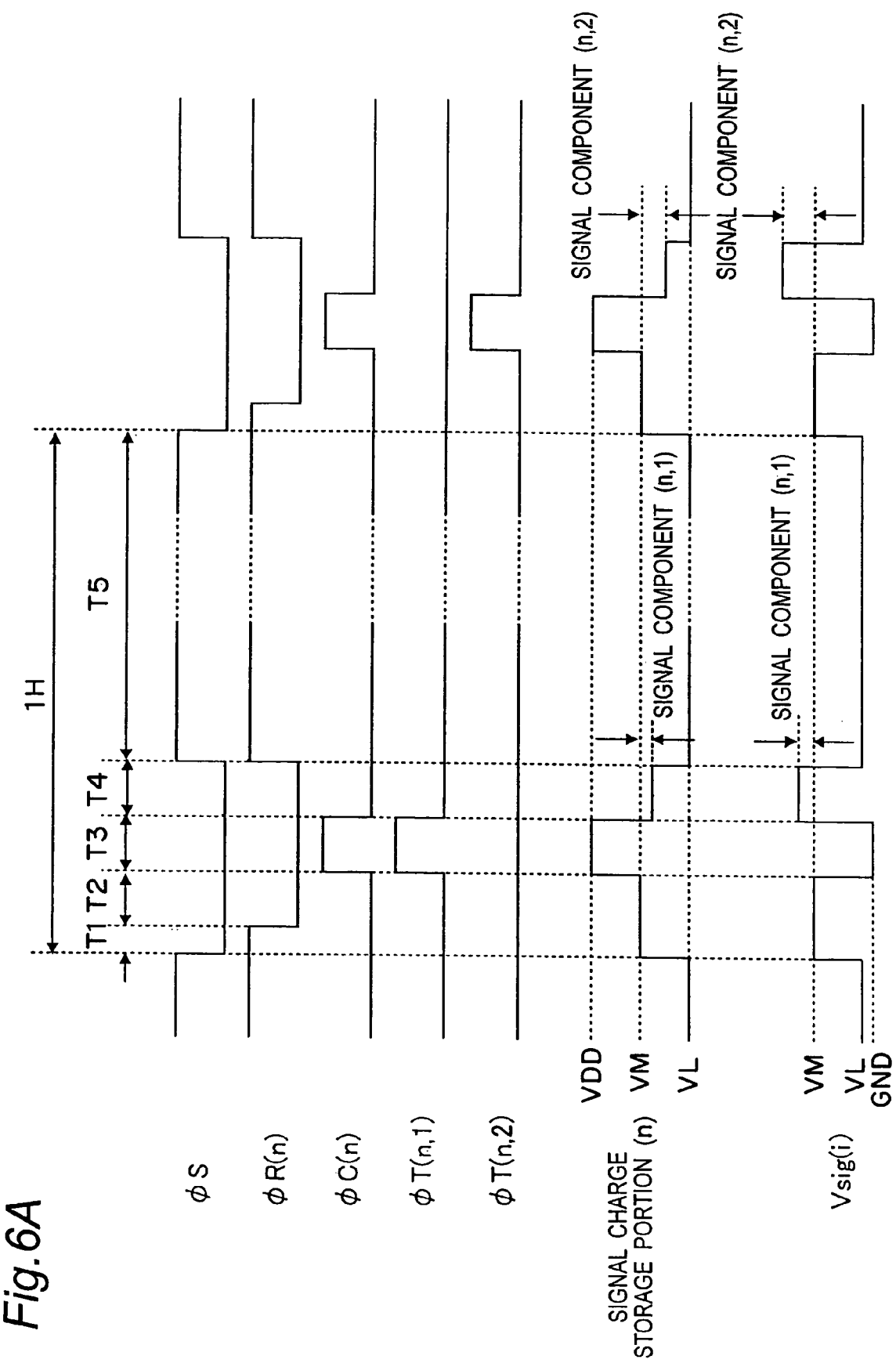

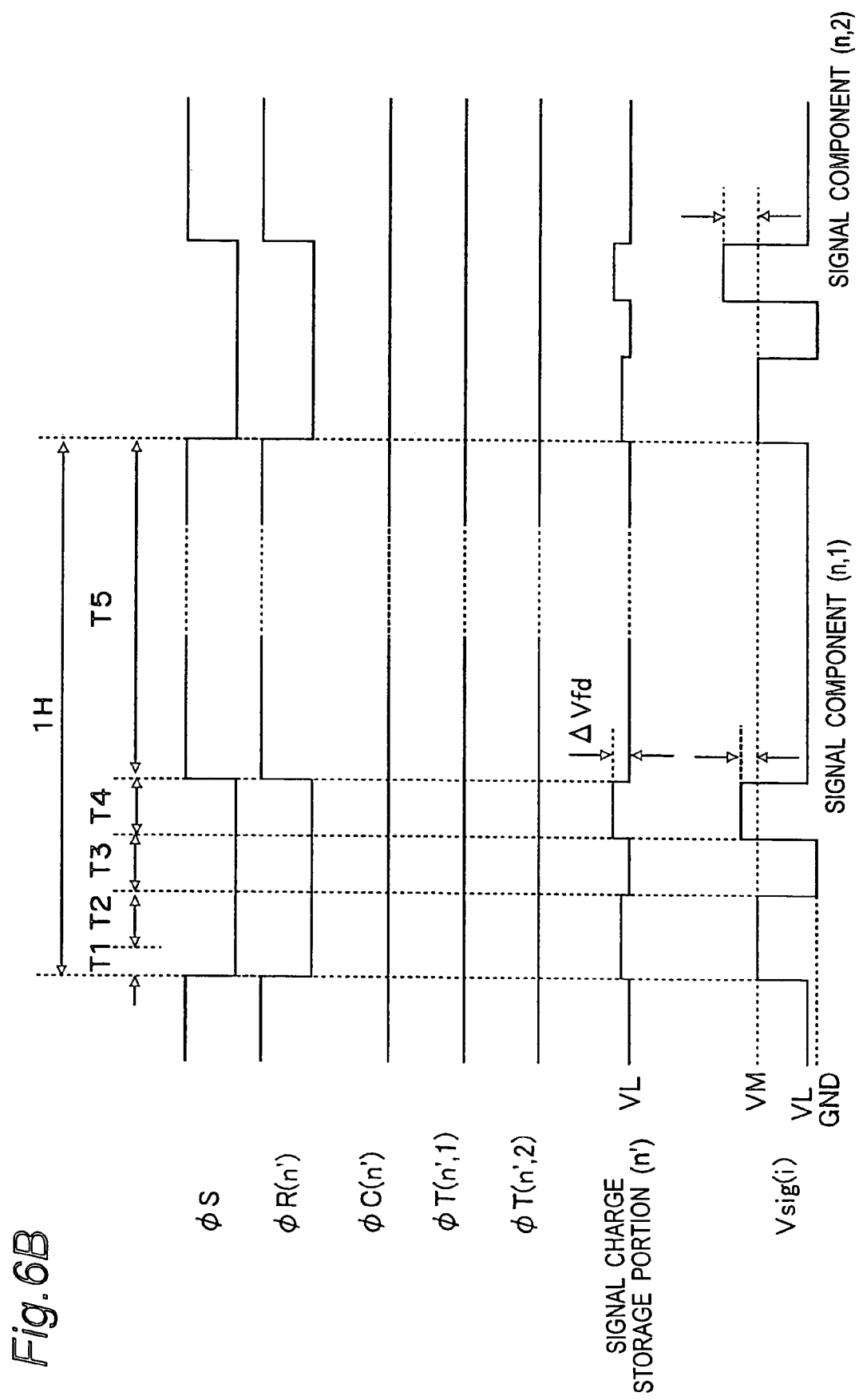

AMPLIFICATION TYPE SOLID-STATE IMAGING DEVICE

CROSS-REFERENCE TO RELATED APPLICATIONS

This nonprovisional application claims priority under 35 U.S.C. §119(a) on Patent Application No(s). 2005-122202 filed in Japan on Apr. 20, 2005, the entire contents of which are hereby incorporated by reference.

BACKGROUND OF THE INVENTION

The present invention relates to an amplification type solid-state imaging device and to a method for achieving a low-noise amplification type solid-state imaging device with a small pixel size.

Conventionally, an amplification type solid-state imaging device, which has a pixel section that has an amplification function and a scanning circuit provided at the periphery of the pixel section and reads pixel data by the scanning circuit, has been proposed as the amplification type solid-state imaging device. In particular, an APS (Active Pixel Sensor) type image sensor constructed of CMOS (Complementary Metal Oxide Semiconductor) advantageous for the integration of the pixel construction with the peripheral drive circuit and the signal processing circuit is known.

In the APS type image sensor, a photoelectric conversion section, an amplification section, a pixel selection section and a reset section need to be normally formed in one pixel. Therefore, the APS type image sensor employs three to four MOS transistors besides the photoelectric conversion section that is normally constructed of a photodiode.

However, if three to four MOS transistors are necessary for one pixel, it becomes a restriction on the reduction in the pixel size. Accordingly, a method for reducing the transistor count per pixel is proposed (refer to JP H09-46596 A).

FIG. 7 shows a circuit diagram of the essential part of the amplification type solid-state imaging device in which the transistor count per pixel is reduced. The amplification type solid-state imaging device is constructed of a photodiode 101, a transfer transistor 102 for transferring a signal charge accumulated in the photodiode 101, a reset transistor 131, an amplification transistor 132 and a pixel select transistor 133. In this case, it is known that remarkable noise reduction can be achieved and a high-quality image can be obtained if the photodiode 101 is of a buried type and signal charge transfer from the photodiode 101 is made complete.

The operation of the amplification type solid-state imaging device shown in FIG. 7 is shown in the timing chart of FIG. 8.

As shown in FIG. 8, during a period T1, a drive pulse φR(m) applied to the gate of the common reset transistor 131 goes high level to turn on the reset transistor 131 and raise the potential under the gate. Therefore, charge migration to the drain side of the common reset transistor 131 is caused by a common signal charge storage portion 108, and the voltage of the signal charge storage portion 108 is reset to a power voltage VDD.

Next, during a period T2, the drive pulse φR(m) applied to the gate of the common reset transistor 131 goes low level to turn off the reset transistor 131. However, since a drive pulse φS(m) applied to the gate of the common pixel select transistor 133 is still at high level and the pixel select transistor 133 is in ON-state, the reset level is read to a signal line 135 via a common amplification transistor 132. At this time, the amplification transistor 132 and a constant current load transistor 134 constitute a source follower circuit.

Next, during a period T3, the drive pulse φS(m) applied to the gate of the common pixel select transistor 133 goes low level to turn off the pixel select transistor 133, and a drive pulse φT(m,1) applied to the gate of the transfer transistor 102 of the (m,1)-th row goes high level to enter the ON-state to raise the potential of the gate. Therefore, the signal charge accumulated in the photodiode 101 of the (m,1)-th row is transferred to the signal charge storage portion 108.

Next, during a period T4, the drive pulse φT(m,1) applied to the gate of the transfer transistor 102 of the (m,1)-th row goes low level to turn off the transfer transistor 102. However, the voltage at the time of signal charge transfer is maintained in the common signal charge storage portion 108, and the drive pulse φS(m) applied to the gate of the common pixel select transistor 133 goes high level to enter the ON-state. Therefore, the signal level of the (m,1)-th row is read to the signal line 135 via the common amplification transistor 132.

Then, after one horizontal scanning period (1H), a signal charge from the photodiode 101 of the (m,2)-th row is conducted to the common reset transistor 131, the amplification transistor 132 and the pixel select transistor 133 via the transfer transistor 102 of the (m,2)-th for the pixel of the (m,2)-th row, and operation similar to that of the periods T1 through T4 are carried out.

With regard to the construction and operation, 2.5 transistors/pixel result when one common portion per two pixels, and 1.75 transistors/pixel result when one common portion per four pixels. That is, the above transistor count per pixel can be reduced in these examples.

However, in the conventional amplification type solid-state imaging device, the following problems occur with respect to the construction and operation. That is, assuming that the capacitance of the common signal charge storage portion 108 is CFD, then a charge-to-voltage conversion efficiency η for converting a signal charge ΔQsig from the photodiode 101 into a voltage signal ΔVsig becomes:

$$\eta = G \cdot \Delta Vsig / \Delta Qsig = G/CFD$$

where G is the gain of the source follower circuit constructed of the amplification transistor 132 and the constant current load transistor 134 and normally has a value slightly smaller than one (0.8 to 0.9). In order to increase η, the capacitance CFD must be reduced. The capacity CFD of the signal charge storage portion 108 is a sum total of the drain side junction capacitance of the transfer transistor 102 connected to the signal charge storage portion 108, the gate capacitance of the amplification transistor 132 and a junction capacitance to the substrate. Accordingly, there is a problem that the charge-to-voltage conversion efficiency η is reduced as the photodiodes and transfer transistors connected to the common signal charge storage portion are increased in number.

SUMMARY OF THE INVENTION

The present invention is intended to solve the problems and has an object to provide an amplification type solid-state imaging device capable of obtaining a high-quality image and reducing the pixel size.

In order to achieve the above object, there is provided an amplification type solid-state imaging device in which a photoelectric conversion and transfer portion having a photoelectric transducer and a transfer transistor for transferring a signal charge of the photoelectric transducer is provided for each pixel, wherein a plurality of photoelectric conversion and transfer portions provided for the pixels are grouped in a group of a prescribed number of photoelectric conversion and transfer portions, the device comprises:

a switched capacitor amplifier portion which is provided for each of the photoelectric conversion and transfer portion group and has an input side connected to an output side of each transfer transistor of the photoelectric conversion and transfer portion group and an output side connected to a signal line;

a power source side load connected to the output side of the switched capacitor amplifier portion via the signal line;

a switchover portion for switching the power source side load, which is connected to the signal line, to a constant voltage portion; and a control section that controls the transfer transistor, the switched capacitor amplifier portion and the switchover portion, the switched capacitor amplifier portion comprises: a signal charge storage portion connected to the output side of each transfer transistor of the photoelectric conversion and transfer portion group; an amplification transistor that has an input side connected to the signal charge storage portion and an output side connected to the signal line; a capacitance element connected between input and output of the amplification transistor; and a reset transistor connected between input and output of the amplification transistor, and an input side voltage of the inverting amplifier constructed of the amplification transistor of the switched capacitor amplifier portion and the power source side load is controlled by controlling the reset transistor of the switched capacitor amplifier portion and the switchover portion by means of the control section.

According to the amplification type solid-state imaging device of the construction, the control section controls the transfer transistor and the switched capacitor amplifier portion so as to read a signal from the photoelectric transducer via the transfer transistor in each of the photoelectric conversion and transfer portion group by means of a switched capacitor amplifier portion in each of the photoelectric conversion and transfer portion group.

By thus providing the amplification circuit (switched capacitor amplifier portion that converts a signal charge into a voltage and amplifies the same) common to the plurality of pixels of the photoelectric conversion and transfer portion group, the transistor count per pixel can be reduced. Moreover, by providing the amplification circuit of the switched capacitor type, the capacitance of the signal charge storage portion can effectively be reduced, and the charge-to-voltage conversion gain can be improved. Therefore, a low-noise high-quality image can be obtained, and the pixel size can be reduced by largely reducing the transistor count per pixel.

Further, by turning on the reset transistor by controlling the reset transistor and the switchover portion of the switched capacitor amplifier portion by the control section to switch the power source side load connected to the signal line to the constant voltage portion, it becomes possible to make the input side voltage of the inverting amplifier constructed of the amplification transistor of the switched capacitor amplifier portion and the power source side load have the voltage of the constant voltage portion. For example, by making the voltage of the constant voltage portion lower than the threshold voltage of the amplification transistor of the switched capacitor amplifier portion, the inverting amplifier does not operate. Therefore, by controlling the reset transistor and the switchover portion of the switched capacitor amplifier portion by the control section, the operation of the inverting amplifier can be controlled with a simple construction.

In one embodiment of the invention, the control section controls the input side voltage of the inverting amplifier by switching the power source side load connected to the signal line to the constant voltage portion and turning on the reset transistor of the switched capacitor amplifier portion by controlling the switchover portion during a period in which signal charge read operation is not carried out.

According to the amplification type solid-state imaging device of the embodiment, it becomes possible to control the operation of the inverting amplifier by controlling the input side voltage of the inverting amplifier by switching the power source side load connected to the signal line to the constant voltage portion with the switchover portion controlled by the control section during the period in which the switched capacitor amplifier portion does not read the signal charge. As a result, it becomes possible to form no signal output from the switched capacitor amplifier portion to the signal line by controlling the inverting amplifier so that the amplifier does not operate during the period in which the signal charge read operation is not carried out. Therefore, the select transistor for selecting the line (photoelectric conversion and transfer portion group) to be read becomes unnecessary, and this makes it possible to reduce the transistor count per pixel and reduce the pixel size by further reducing the transistor count per pixel.

In one embodiment of the invention, the photoelectric transducer is a buried type photodiode.

According to the amplification type solid-state imaging device of the embodiment, the signal charge transfer from the buried type photodiode becomes complete, thus a low-noise high-quality image can be obtained.

In one embodiment of the invention, the switched capacitor amplifier portion has a boosting capacitance element that has one terminal connected to the output side of each transfer transistor of the photoelectric conversion and transfer portion group, and the control section controls a voltage of the other terminal of the boosting capacitance element so that a voltage on the output side of each transfer transistor of the photoelectric conversion and transfer portion group is deepened when the signal charge is transferred from the photoelectric transducer to the signal charge storage portion of the switched capacitor amplifier portion via the transfer transistor.

According to the amplification type solid-state imaging device of the embodiment, the potential of the signal charge storage portion on the input side of the inverting amplifier is made deeper than when no boosting capacitance element is employed by controlling the other terminal voltage of the boosting capacitance element by means of the control section when a charge is transferred from the photoelectric transducer to the signal charge storage portion via the transfer transistor, facilitating the signal charge transfer. As a result, it becomes possible to make the charge transfer from the photodiode to the signal charge storage portion complete particularly when the photoelectric transducer is the buried type photodiode and to largely reduce the read noise.

In one embodiment of the invention, the power source side load that constitutes the inverting amplifier is a constant current load transistor or a resistor.

In one embodiment of the invention, the transfer transistor is a depletion type transistor, and a potential under a gate of the transfer transistor in an OFF-state is shallower than a voltage of the constant voltage portion.

According to the amplification type solid-state imaging device of the embodiment, by employing the depletion type transistor for the transfer transistor, a discharge path of the excessive signal charge to the signal line is formed by way of the photoelectric transducer, the transfer transistor, the signal charge storage portion and the reset transistor. Even at the time of imaging a high-luminance subject, the overflow of the signal charge to the surrounding pixels and the blooming phenomenon do not occur, and a high-quality image can be obtained. Moreover, by making the potential under the gate of the transfer transistor in the OFF-state shallower than the voltage of the constant voltage portion, the charge injection from the input side of the inverting amplifier that has come to have the voltage of the constant voltage portion, i.e., from the signal charge storage portion to the photoelectric transducer can be prevented when the reset transistor is turned on by switching the power source side load connected to the signal line to the constant voltage portion by means of the control section.

In one embodiment of the invention, the control section controls the input side voltage of the inverting amplifier by switching the power source side load connected to the signal line to the constant voltage portion and turning on the reset transistor of the switched capacitor amplifier portion by controlling the switchover portion during a period in which signal charge read operation is not carried out.

According to the amplification type solid-state imaging device of the embodiment, it becomes possible to control the operation of the inverting amplifier by controlling the input side voltage of the inverting amplifier by switching the power source side load connected to the signal line to the constant voltage portion with the switchover portion controlled by the control section during the period in which the switched capacitor amplifier portion does not read the signal charge. As a result, the signal can be prevented from being outputted from the switched capacitor amplifier portion to the signal line by controlling the inverting amplifier so that the amplifier does not operate during the period in which the signal charge read operation is not carried out. Therefore, the select transistor for selecting the line (photoelectric conversion and transfer portion group) to be read becomes unnecessary, and this makes it possible to reduce the transistor count per pixel and further reduce the pixel size by reducing the transistor count per pixel.

In one embodiment of the invention, the photoelectric transducer is a buried type photodiode.

According to the amplification type solid-state imaging device of the embodiment, the signal charge transfer from the buried type photodiode becomes complete, thus a low-noise high-quantity image can be obtained.

In one embodiment of the invention, the switched capacitor amplifier portion has a boosting capacitance element that has one terminal connected to the output side of each transfer transistor of the photoelectric conversion and transfer portion group, and the control section controls a voltage of the other terminal of the boosting capacitance element so that a voltage on the output side of each transfer transistor of the photoelectric conversion and transfer portion group is deepened when the signal charge is transferred from the photoelectric transducer to the signal charge storage portion of the switched capacitor amplifier portion via the transfer transistor.

According to the amplification type solid-state imaging device of the embodiment, by making the potential of the signal charge storage portion on the input side of the inverting amplifier deeper than when no boosting capacitance element is employed by controlling the other terminal voltage of the boosting capacitance element by means of the control section when the charge is transferred from the photoelectric transducer to the signal charge storage portion via the transfer transistor, facilitating the signal charge transfer. As a result, it becomes possible to make the charge transfer from the photodiode to the signal charge storage portion complete particularly when the photoelectric transducer is the buried type photodiode and to largely reduce the read noise.

As is apparent from the above, according to the amplification type solid-state imaging device of the present invention, it becomes possible to largely reduce the transistor count per pixel without reducing the charge-to-voltage conversion efficiency by employing the switched capacitor amplifier portion common to a plurality of pixels, and this is extremely advantageous for the reduction in the pixel size.

In particular, it becomes possible to further reduce the transistor count and to largely increase the amplification factor by dividing the inverting amplifier into the driving side (amplification transistor of the switched capacitor amplifier portion) and the power source side load via the common signal line and further controlling the input side voltage of the inverting amplifier by controlling the reset transistor and the switchover portion of the switched capacitor amplifier portion by means of the control section. As a result, the reduction in the pixel size and the increase in the charge-to-voltage conversion gain become further advantageous.

Furthermore, it becomes possible to improve the signal charge transfer from the photodiode by providing the photodiode of the buried type and to obtain a very low-noise image by virtue of the complete charge transfer.

For the above reasons, the amplification type solid-state imaging device of the present invention becomes extremely useful for the formation of a compact high-performance image sensor.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein:

FIG. 2B is a timing chart of drive pulses during the operation of the line (signal charge storage portion group) from which the signal charge is not read at the two-dimensional amplification type solid-state imaging device;

FIG. 6A is a timing chart of drive pulses of the two-dimensional amplification type solid-state imaging device;

FIG. 6B is a timing chart of drive pulses during the operation of the line (signal charge storage portion group) from which the signal charge is not read at the two-dimensional amplification type solid-state imaging device;

DETAILED DESCRIPTION OF THE INVENTION

Figure 1:
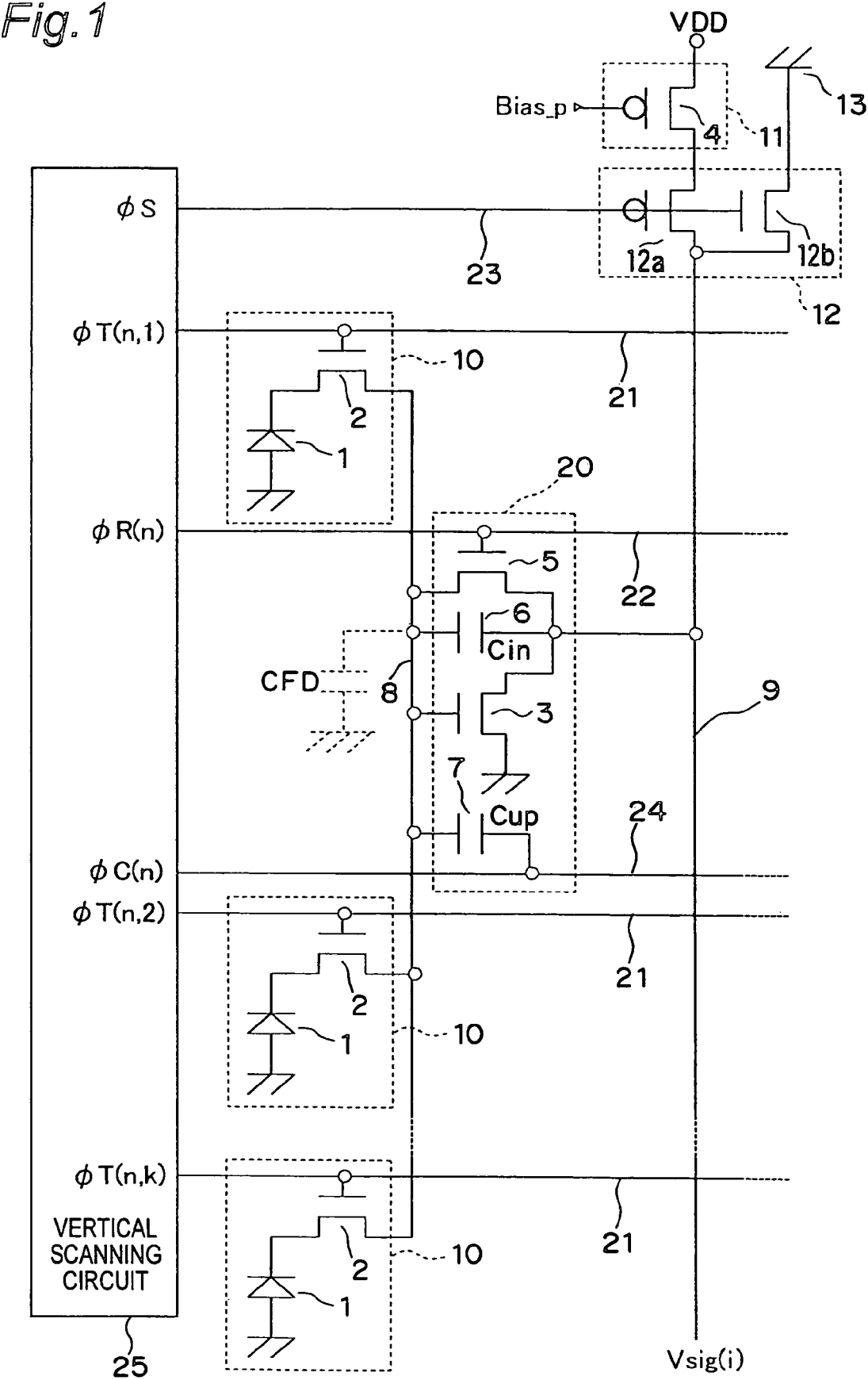
FIG. 1 is a circuit diagram showing the construction of a two-dimensional amplification type solid-state imaging device according to a first embodiment of the present invention.

The amplification type solid-state imaging device of the present invention will be described in detail below by the embodiments shown in the drawings.

First Embodiment

FIG. 1 is a circuit diagram showing the construction of a two-dimensional amplification type solid-state imaging device as one example of the amplification type solid-state imaging device of the first embodiment of the present invention. The two-dimensional amplification type solid-state imaging device has a plurality of pixels that are two-dimensionally arranged in a matrix form.

The figure shows a photoelectric conversion and transfer portion 10 existing in each of all the pixels, a switched capacitor amplifier portion 20 shared by k photoelectric conversion and transfer portions 10 arranged in the vertical direction, a power source side load 11 that is a constant current load transistor 4 shared by all the switched capacitor amplifier portions 20 existing in the i-th column, and a switch circuit 12 as one example of the switchover portion for switching the power source side load 11 constructed of the constant current load transistor 4 to a constant voltage portion 13 (ground potential). The reference numeral 25 denotes a vertical scanning circuit as one example of the control section. A bias signal Bias_p is applied to the base of the constant current load transistor 4, and a power voltage VDD is applied to the vertical signal line 9 via the constant current load transistor 4.

In FIG. 1, among a plurality of rows and a plurality of columns, only i-th column of the photoelectric conversion and transfer portions 10 is shown, and the switched capacitor amplifier portion 20 is connected to each of k photoelectric conversion and transfer portions 10 as a photoelectric conversion and transfer portion group in each column. It is noted that k and i are integers of not smaller than two.

The photoelectric conversion and transfer portion 10 is constructed of a photodiode 1 as one example of the photoelectric transducer and a transfer transistor 2.

Moreover, the switched capacitor amplifier portion 20 is constructed of a signal charge storage portion 8 to which the output side of the transfer transistors 2 of the k photoelectric conversion and transfer portions 10 as the photoelectric conversion and transfer portion group are connected, an amplification transistor 3 whose input side is connected to the signal charge storage portion 8 and output side is connected to the vertical signal line 9, a reset transistor 5 and a capacitor 6 as one example of the capacitance element respectively inserted between the input and the output of the amplification transistor 3. The amplification transistor 3 constitutes a constant current load type source grounded inverting amplifier together with the constant current load transistor 4. One end of a boosting capacitor 7 as one example of the boosting capacitance element is connected to the signal charge storage portion 8 in order to boost the voltage of the signal charge storage portion 8 common to the k photoelectric conversion and transfer portions 10 on the input side of the above inverting amplifier. In this case, the capacitance of the signal charge storage portion 8 is denoted by CFD, the capacitance of the capacitor 6 is denoted by Cin, and the capacitance of the boosting capacitor 7 for raising the voltage is denoted by Cup.

A switch circuit 12 for controlling the voltage of the vertical signal line 9 is constructed of mutually antiphase switchover transistors controlled by a common drive pulse φS to perform switchover between the power source side load 11 and the constant voltage portion 13 (ground potential). That is, the switch circuit 12 has a transistor 12a that is turned on when the drive pulse φS is at low level to connect the constant current load transistor 4 to the vertical signal line 9 and a transistor 12b that is turned on when the drive pulse φS is at high level to connect the constant voltage portion 13 to the vertical signal line 9.

As shown in FIG. 1, a transfer transistor drive signal line 21, a reset transistor drive signal line 22, a switchover signal line 23 and a voltage control line 24 have one end connected to the control section 25. The transfer transistor drive signal line 21 is connected to the gate of the transfer transistor 2 of the photoelectric conversion and transfer portions 10 arranged in the direction of row. Moreover, the reset transistor drive signal line 22 is connected to the gate of the reset transistor 5 of the switched capacitor amplifier portion 20. Moreover, the switchover signal line 23 is connected to the switch circuit 12, and the voltage control line 24 is connected to the other end of the boosting capacitor 7.

Moreover, in FIG. 1, the pixel of the first row connected to the n-th switched capacitor amplifier portion 20 is indicated by (n,1), the pixel of the second row is indicated by (n,2), and the pixel of the k-th row is indicated by (n,k). Therefore, when the two-dimensional amplification type solid-state imaging device is constructed of p switched capacitor amplifier portions 20 in the vertical direction, there is a total of k×p pixels in the vertical direction. Drive pulses φT(n,1), φT(n,2), . . . , φT(n,k) are applied to the gates of the transfer transistors 2 of the (n,1) pixel, (n,2) pixel, . . . , (n,k) pixel.

Moreover, a drive pulse φR(n) is applied to the gate of the reset transistor 5 via the reset transistor drive signal line 22, and a control pulse φC(n) for raising the voltage of the signal charge storage portion 8 by a capacitance value Cup is applied via a voltage control line 24 in the n-th switched capacitor amplifier portion 20.

Moreover, a drive pulse φS that controls the mutually antiphase transistors of the switch circuit 12 is applied via the switchover signal line 23 in order to perform switchover of the vertical signal line 9 between the power source side load 11 and the constant voltage.

It is noted that the purpose of the constant current load transistor 4 can be achieved even with a high resistance constructed of a diffusion layer or the like instead of the transistor. Moreover, although the first embodiment describes the two-dimensional amplification type solid-state imaging device that employs the constant current load type source grounded inverting amplifier, the purpose can be achieved also with a transistor load type source grounded inverting amplifier or a cascode type source grounded inverting amplifier.

The operation of the two-dimensional amplification type solid-state imaging device shown in FIG. 1 is described with reference to FIGS. 2A and 2B.

Figure 2A:
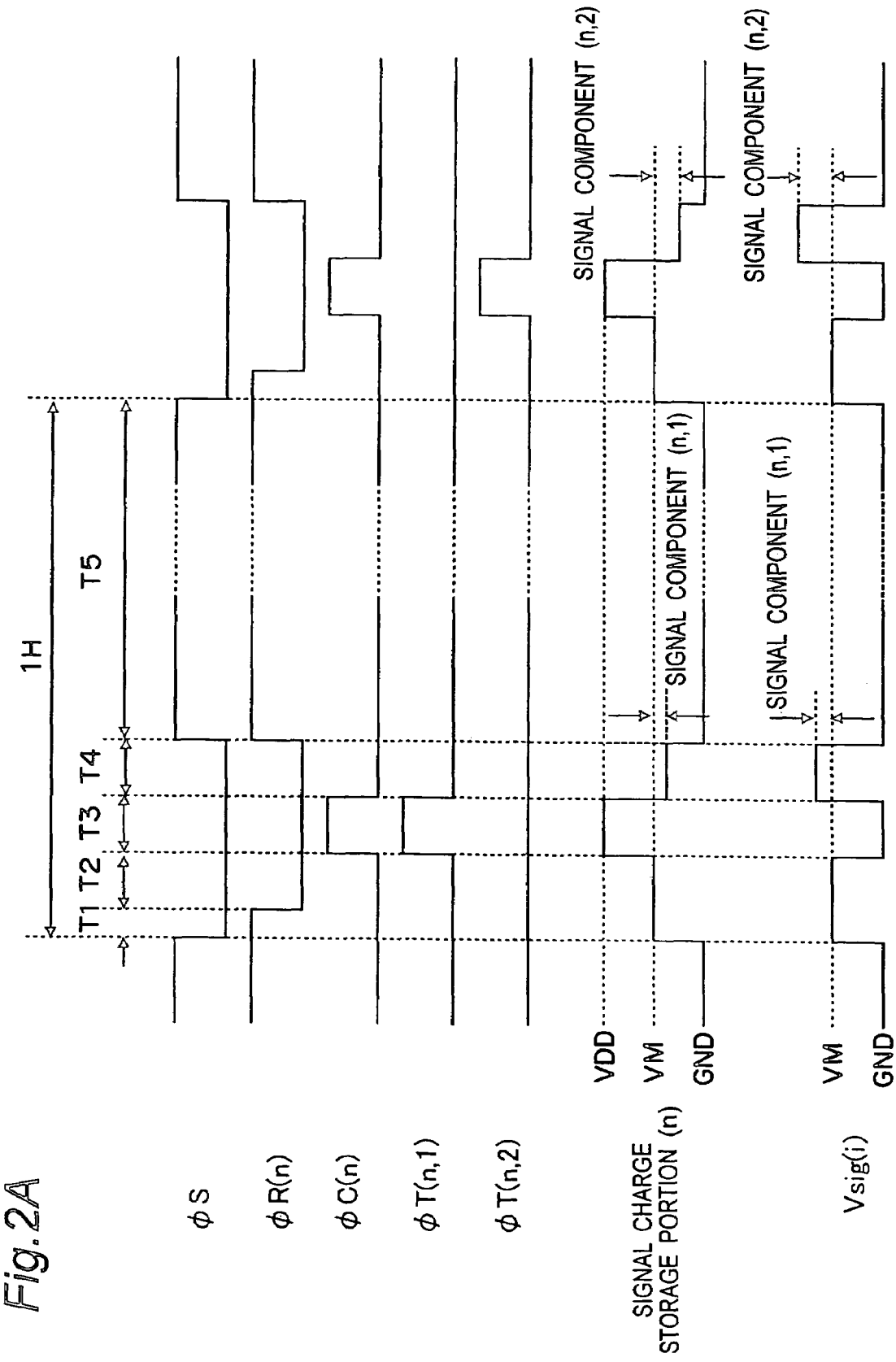
FIG. 2A is a timing chart of drive pulses of the two-dimensional amplification type solid-state imaging device.

FIG. 2A shows the operation of the line (signal charge storage portion group) from which the signal charge is read. During the period T1, the drive pulse φR(n) applied to the gate of the reset transistor 5 of the switched capacitor amplifier portion 20 of the n-th row is at high level, and therefore, the reset transistor 5 is in the ON-state. In addition, since the drive pulse φS inputted to the switch circuit 12 is at low level, the vertical signal line 9 is connected to the constant current load transistor 4 consequently short-circuiting the input and the output of the inverting amplifier constructed of the amplification transistor 3 and the constant current load transistor 4, and the voltage Vsig(i) of the signal charge storage portion 8 and the vertical signal line 9 is reset to a constant voltage VM.

Figure 3:
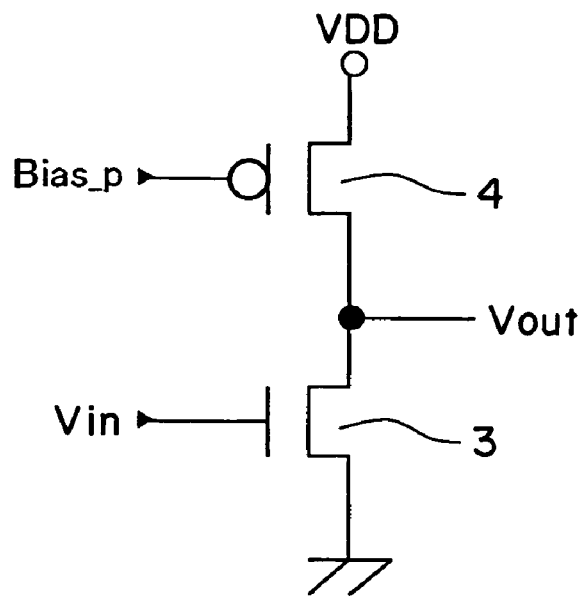
FIG. 3 is a circuit diagram of the inverting amplifier single unit of the two-dimensional amplification type solid-state imaging device.
Figure 4:
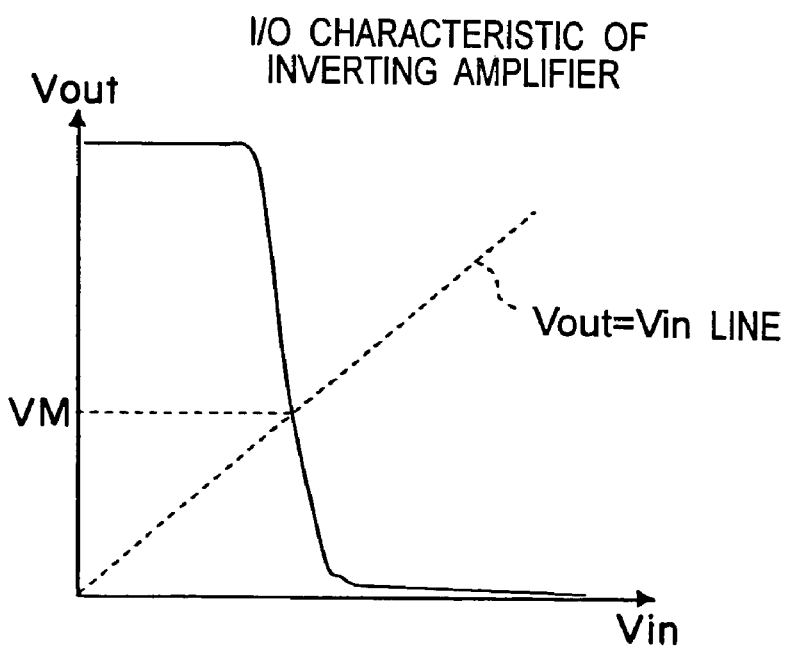
FIG. 4 is a characteristic of the inverting amplifier of the two-dimensional amplification type solid-state imaging device.

The reason for the above is as follows. FIG. 3 shows a circuit diagram of the inverting amplifier, and FIG. 4 shows its characteristic. Assuming now that the input and the output of the inverting amplifier is short-circuited, an intersecting point of the characteristic curve of the inverting amplifier and a straight line of Vout=Vin comes to have the constant voltage VM and is reset to the voltage.

Next, during the period T2 shown in FIG. 2A, the drive pulse φR(n) goes low level to turn off the reset transistor 5. The vertical signal line voltage obtained at this time is the reference voltage of the pixel.

The next period T3 is a period during which the signal charge photoelectrically converted by the photodiode 1 of the pixel is read to the signal charge storage portion 8.

By making the drive pulse φT(n,1) have high level, the signal charge accumulated in the photodiode 1 of the (n,1)-th row is read by the transfer transistor 2 of the (n,1)-th row to the signal charge storage portion 8. Further, by making a control pulse φC(n) have high level at this time, the voltage of the signal charge storage portion 8 coupled by the capacitance Cup of the boosting capacitor 7 rises to promote the charge transfer from the photodiode 1 to the signal charge storage portion 8, and complete charge transfer becomes possible.

During the next period T4, the drive pulse φT(n,1) and the control pulse φC(n) come to have low level, as a consequence of which a voltage shifted from the voltage during the period T2 by the amount corresponding to the above signal charge transfer is maintained in the signal charge storage portion 8, and the maintained signal level is amplified by the inverting amplifier and outputted to the vertical signal line 9. The vertical signal line voltage obtained at this time becomes the signal of the pixel.

During the next period T5, the vertical signal line 9 and the signal charge storage portion 8 are short-circuited by the reset transistor 5 by changing the drive pulse φR(n) from low level to high level. Further, the drive pulse φS of the switch circuit 12 is made to have high level, thereby turning off the transistor 12a of the switch circuit 12 and turning on the transistor 12b and to make the voltage of the vertical signal line 9 have the ground potential. As a result, the voltage of the signal charge storage portion 8 is maintained at the ground potential.

If a signal difference on the vertical line 9 between the period T2 and the period T4 is taken by a CDS (Correlated Double Sampling) circuit, a differential amplifier circuit or a clamping circuit (not particularly described in th present specification) in the stage subsequent to the vertical signal line 9, then an effective signal due to the charge generated by the light incident on the pixel of the (n,1)-th row is read.

Although the description of the operation is in the case of the pixel of the (n,1)-th row, the same thing can be said for the operations in the pixels of the (n,2)-th through (n,k)-th rows, and a difference resides only in that the drive pulse for turning on the transfer transistor 2 is selected to φT(n,2) through φT(n,k). FIG. 2A also shows the timing in the case of the (n,2)-th row.

In this case, assuming that the quantity of charge transferred from the photodiode 1 is ΔQsig and the gain of the inverting amplifier is A, then the effective signal to be read is expressed by:

$$\Delta Vsig = A \cdot \Delta Qsig / [CFD + Cup + (1+A)Cin]$$ Equation (1)

where the gain A of the inverting amplification amplifier is expressed by:

$$A = gm \cdot \frac{ron \cdot rop}{ron + rop}$$ Equation (2)

In Equation (2), gm is the transconductance of the amplification transistor 3, ron is the output resistance of the amplification transistor 3, and rop is the output resistance of the constant current load transistor 4.

Moreover, when the gain A of the inverting amplifier is very large, $$\Delta Vsig \approx \Delta Qsig / Cin$$ Equation (3)

and eventually the charge-to-voltage conversion efficiency η becomes:

$$\eta = \Delta Vsig / \Delta Qsig = 1/Cin$$ Equation (4)

In detail, it is indicated that the outputted signal does not depend on the capacitance CFD of the signal charge storage portion 8, and the charge-to-voltage conversion efficiency η is not reduced even when the number of vertically connected pixels increases and the capacitance CFD is increased according to the present invention.

On the other hand, the operation of the line (signal charge storage portion group) from which the signal charge is not read is shown in FIG. 2B. As in the operation of the line (signal charge storage portion group) from which the signal charge is read, the voltage of the signal charge storage portion (n') 8 is maintained at the ground potential during the time T5. During the time from T1 through T4, the voltage of the signal charge storage portion (n') 8 is still maintained at the ground potential by cutting off the vertical signal line 9 from the signal charge storage portion 8 with the drive pulse φR(n') applied to the gate of the reset transistor 5 kept at low level even when the voltage of the vertical signal line 9 changes.

Then, the voltage of the signal charge storage portion (n') 8 is influenced by the voltage change of the vertical signal line 9 due to the capacitive coupling of the capacitor 6 during the period T4, and the voltage change is ΔVfd at a maximum. In this case, ΔVfd is:

$$\Delta Vfd = VDD \cdot Cin / (CFD + Cup)$$ Equation (5)

Therefore, if ΔVfd is designed to be not greater than the threshold voltage of amplification transistor 3, the transistor of the line (signal charge storage portion group) from which the signal charge is not read does not operate as an inverting amplifier.

According to the two-dimensional amplification type solid-state imaging device of the construction, it becomes possible to reduce the transistor count per pixel by providing the amplification circuit (switched capacitor amplifier portion 20 that converts the signal charge into the voltage and amplifies the same) common to each of the plurality of pixels of the photoelectric conversion and transfer portion group. Moreover, it becomes possible to effectively reduce the capacitance of the signal charge storage portion 8 and raise the charge-to-voltage conversion gain by virtue of the amplification circuit of the switched capacitor type. Therefore, a low-noise high-quantity image can be obtained with a simple construction, and the pixel size can largely be reduced by largely reducing the transistor count per pixel.

Moreover, by employing a buried type photodiode for the photoelectric transducer of the pixel, the signal charge transfer from the photodiode 1 can be made complete, and a low-noise high-quantity image can be obtained.

Moreover, it becomes possible to make the charge transfer from the buried type photodiode to the signal charge storage portion complete by deepening the potential of the signal charge storage portion 8 on the input side of the inverting amplifier by the control of the other terminal voltage of the boosting capacitor 7 by means of the vertical scanning circuit 25 when the charge is transferred from the photodiode 1 to the signal charge storage portion 8 via the transfer transistor 2 and facilitating the signal charge transfer, and the read noise can largely be reduced.

Moreover, during the period in which the switched capacitor amplifier portion 20 does not read the signal charge, the constant voltage portion 13 (ground potential) is connected to the vertical signal line 9 via the switch circuit 12 by performing switchover of the circuit 12, and the vertical signal line 9 and the signal charge storage portion 8 are short-circuited by further turning on the reset transistor 5. By so doing, the inverting amplifier can be made inoperable by making the voltage of the signal charge storage portion 8 have the ground potential. Therefore, the select transistor for selecting the line to be read (signal charge storage portion group) becomes unnecessary, and the transistor count per pixel can further be reduced.

Second Embodiment

Figure 5:
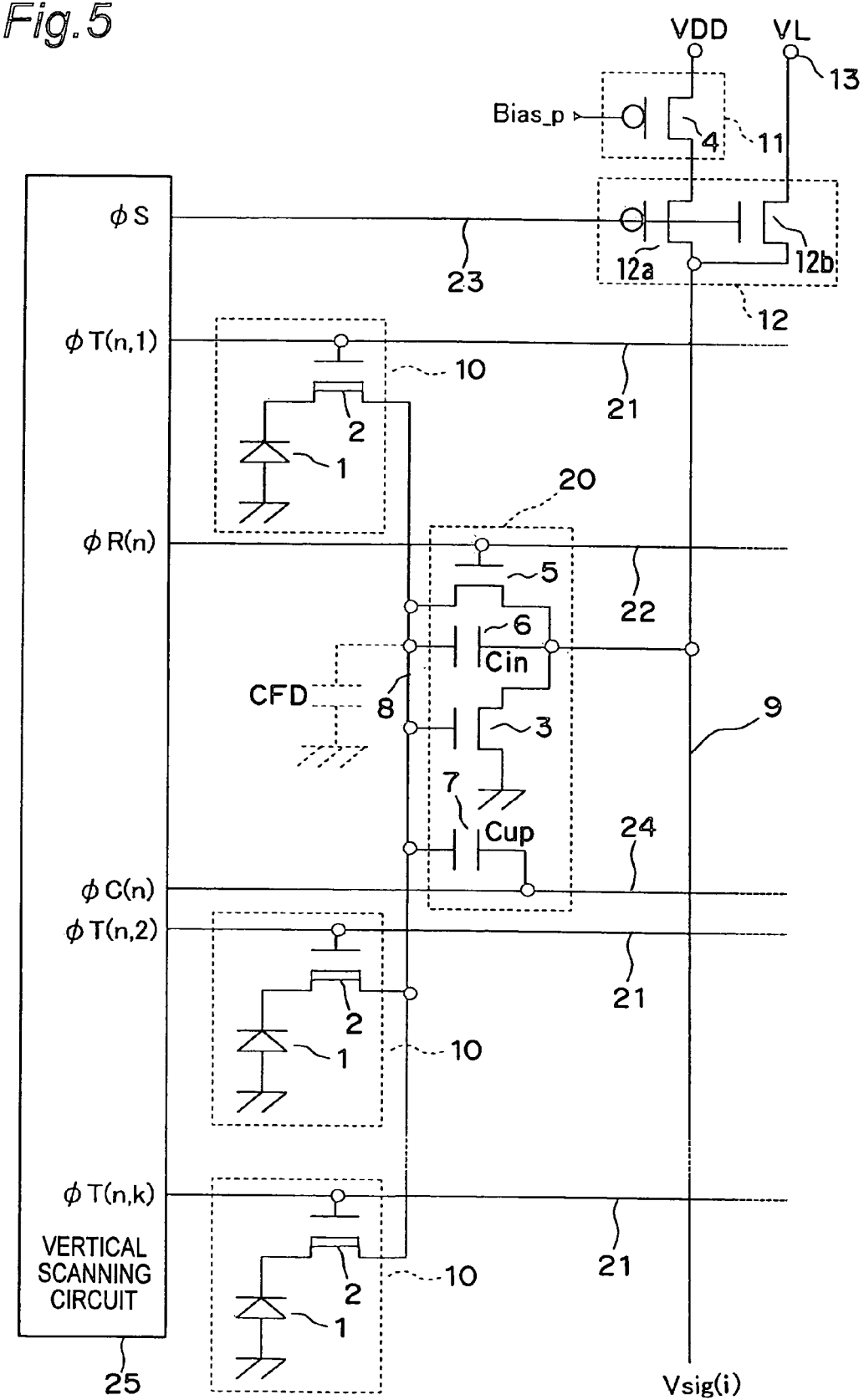
FIG. 5 is a circuit diagram showing the construction of a two-dimensional amplification type solid-state imaging device according to a second embodiment of the present invention.
Figure 7:
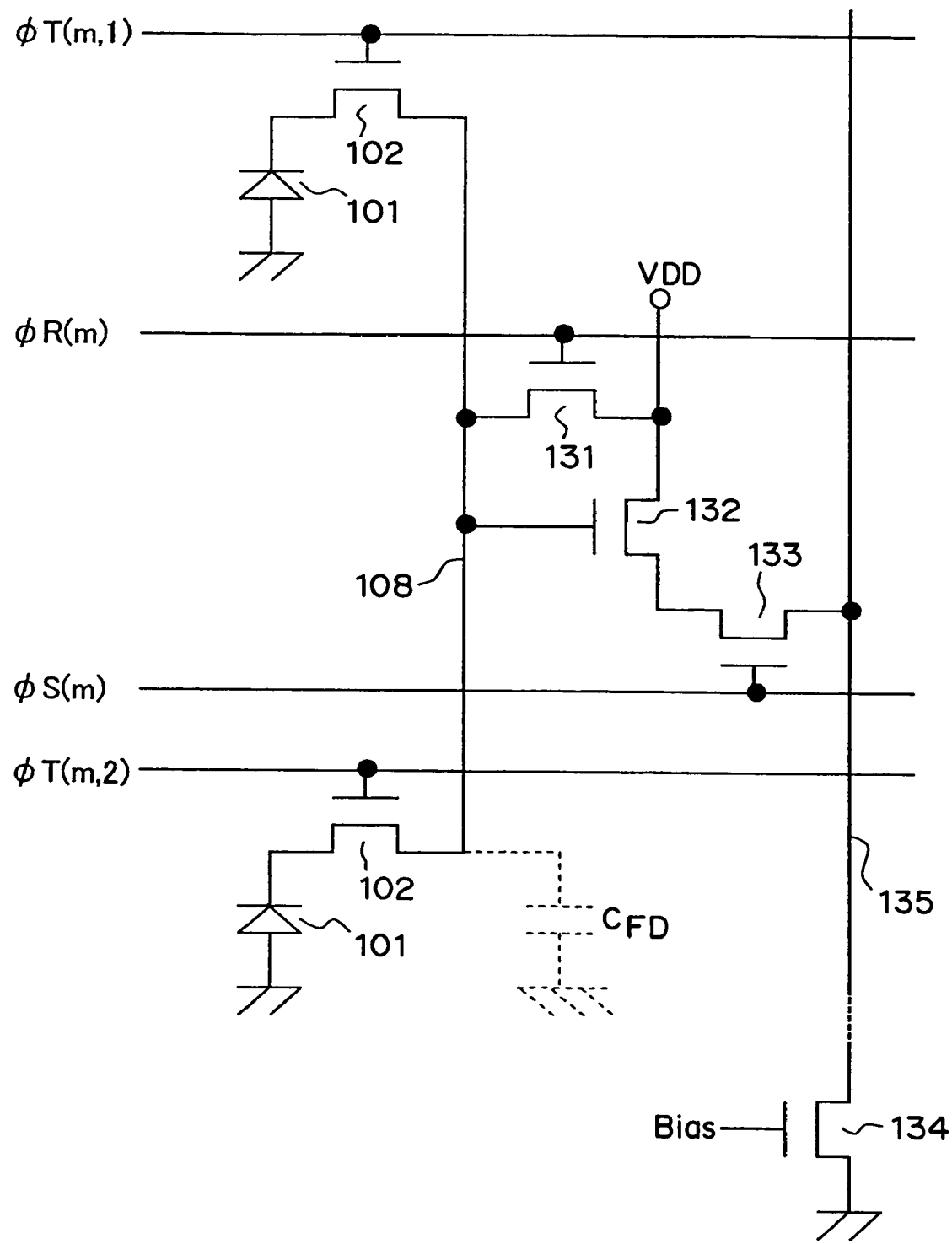
FIG. 7 is a circuit diagram showing the construction of a conventional amplification type solid-state imaging device.
Figure 8:
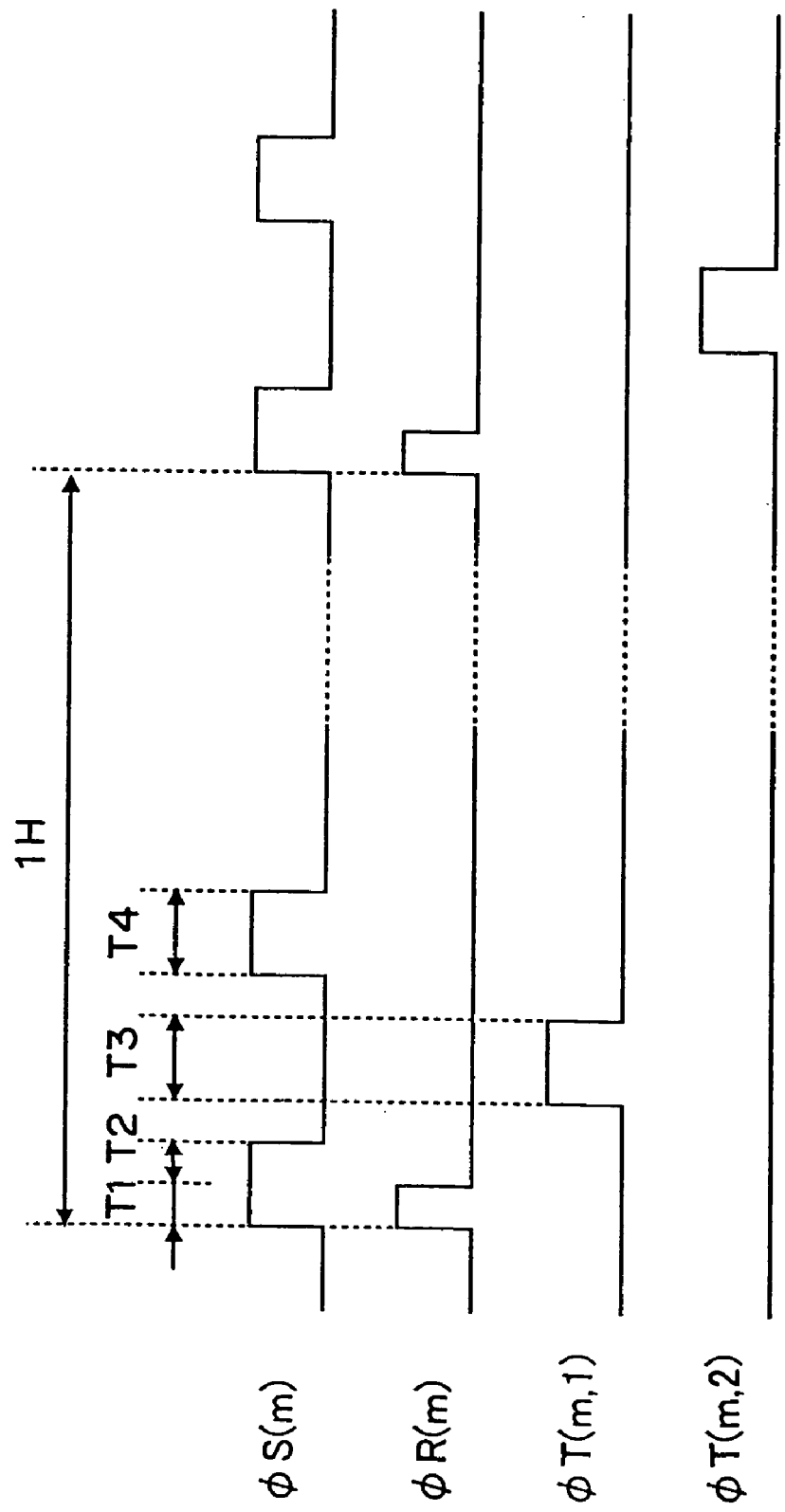
FIG. 8 is a timing chart of drive pulses of the amplification type solid-state imaging device.

FIG. 5 is a circuit diagram showing the construction of a two-dimensional amplification type solid-state imaging device as one example of the amplification type solid-state imaging device of the second embodiment of the present invention. The two-dimensional amplification type solid-state imaging device of the second embodiment has the same construction as that of the first embodiment except that the transfer transistor 2 is of a depletion type and the constant voltage applied to the vertical signal line 9 via the switch circuit 12 is not the ground potential but the constant voltage VL, and no description is provided therefor with the same reference numerals given thereto.

In general, it is sometimes the case where an excessive signal charge overflows to the surrounding photodiodes due to blooming at the time of imaging a high-luminance subject. As a measure against the phenomenon, the transfer transistor 2 is changed from the enhancement type to the depletion type, and a drain path is provided for the excessive signal charge from the photodiode 1 to the signal charge storage portion 8 via the transfer transistor 2.

FIG. 6A shows a timing chart of the drive pulses of the second embodiment. The periods T1 through T4 are quite the same as those of the first embodiment.

Then, the voltage of the vertical signal line 9 is made to have the constant voltage VL by short-circuiting the vertical signal line 9 and the signal charge storage portion 8 by means of the reset transistor 5 by changing the drive pulse $\phi R(n)$ from low level to high level during the next period T5 and further making the drive pulse $\phi S$ of the switch circuit 12 have high level. As a result, the voltage of the signal charge storage portion 8 is maintained at the constant voltage VL during the period T5.

In this case, the reason why the constant voltage portion 13 is not at the ground potential of the first embodiment is that the transfer transistor 2 is the depletion type transistor, and the injection of charge from the signal charge storage portion 8 to the photodiode 1 occurs when the constant voltage portion 13 is made to have the ground potential. Therefore, the constant voltage VL needs to satisfy the expression:

$$VL > V\phi T \qquad \text{Equation (6)}$$

where $V\phi T$ represents the potential under the gate when the gate voltage of the transfer transistor 2 is at low level.

When the period T5 is the greater part of the periods and when a high-luminance subject is imaged during the period, it is possible to perform the blooming suppression operation with the drain path of the excessive signal charge from the photodiode 1 to the constant voltage VL applied to the signal charge storage portion 8 via the transfer transistor 2.

On the other hand, the operation of the line (signal charge storage portion group) from which the signal charge is not read is shown in FIG. 6B. As in the operation of the line (signal charge storage portion group) from which the signal charge is read, the voltage of the signal charge storage portion (n') 8 is maintained at the constant voltage VL during the time T5. During the time from T1 through T4, the voltage of the signal charge storage portion (n') 8 is still maintained at the constant voltage VL by cutting off the vertical signal line 9 from the signal charge storage portion 8 by making the drive pulse $\phi R(n')$ applied to the gate of the reset transistor 5 have low level.

Then, the voltage of the signal charge storage portion 8 is influenced by the voltage change of the vertical signal line 9 due to the capacitive coupling of the capacitor 6 during the period T4, and the voltage change is $\Delta Vfd$ at a maximum. In this case, $\Delta Vfd$ is expressed by Equation (5). Therefore, if $VL+\Delta Vfd$ is designed to be not greater than the threshold voltage of the amplification transistor 3, the inverting amplifier of the switched capacitor amplifier portion 20 of the line (signal charge storage portion group) from which the signal charge is not read does not operate.

If a signal difference on the vertical line 9 between the period T2 and the period T4 is taken by a CDS (Correlated Double Sampling) circuit, a differential amplifier circuit or a clamping circuit (not particularly described in the present specification) in the stage subsequent to the vertical signal line 9, then an effective signal due to the charge generated by the light incident on the pixel of the (n,1)-th row is read quite in the same way as in the first embodiment.

Although the description of the operation is in the case of the pixel of the (n,1)-th row, the same thing can be said for the operations in the case of the pixels of the (n,2)-th through (n,k)-th rows, and the difference resides only in that the drive pulse for turning on the transfer transistor 2 is selected to $\phi T(n,2)$ through $\phi T(n,k)$ quite in the same way as in the first embodiment.

Moreover, this arrangement allows the select transistor, which has been necessary in the conventional pixel structure, to become unnecessary and makes it possible to increase the area of the photodiode 1 in the unit pixel area, obtain a high-quantity image and reduce the pixel size. Moreover, the outputted signal does not depend on the capacitance CFD of the signal charge storage portion 8, and the charge-to-voltage conversion efficiency $\eta$ is not reduced even when the number of vertically connected pixels increases and the capacitance CFD is increased according to the present invention also obviously in the second embodiment.

Although the two-dimensional amplification type solid-state imaging device in which the pixels are two-dimensionally arranged have been described as one example of the amplification type solid-state imaging device in the first and second embodiments, the present invention may be applied to an amplification type solid-state imaging device in which the pixels are linearly arranged.

Embodiments of the invention being thus described, it will be obvious that the same may be varied in many ways. Such variations are not to be regarded as a departure from the spirit and scope of the invention, and all such modifications as

The invention claimed is:

1. An amplification type solid-state imaging device in which a photoelectric conversion and transfer portion having a photoelectric transducer and a transfer transistor for transferring a signal charge of the photoelectric transducer is provided for each pixel, wherein
a plurality of photoelectric conversion and transfer portions provided for the pixels are grouped in a group of a prescribed number of photoelectric conversion and transfer portions,
the device comprises:
a switched capacitor amplifier portion which is provided for each of the photoelectric conversion and transfer portion group and has an input side connected to an output side of each transfer transistor of the photoelectric conversion and transfer portion group and an output side connected to a signal line;
a power source side load connected to the output side of the switched capacitor amplifier portion via the signal line;
a switchover portion for switching the power source side load, which is connected to the signal line, to a constant voltage portion; and
a control section that controls the transfer transistor, the switched capacitor amplifier portion and the switchover portion,
the switched capacitor amplifier portion comprises: a signal charge storage portion connected to the output side of each transfer transistor of the photoelectric conversion and transfer portion group; an amplification transistor that has an input side connected to the signal charge storage portion and an output side connected to the signal line; a capacitance element connected between input and output of the amplification transistor; and a reset transistor connected between input and output of the amplification transistor, and
an input side voltage of the inverting amplifier constructed of the amplification transistor of the switched capacitor amplifier portion and the power source side load is controlled by controlling the reset transistor of the switched capacitor amplifier portion and the switchover portion by means of the control section.

2. The amplification type solid-state imaging device as claimed in claim 1, wherein
the control section controls the input side voltage of the inverting amplifier by switching the power source side load connected to the signal line to the constant voltage portion and turning on the reset transistor of the switched capacitor amplifier portion by controlling the switchover portion during a period in which signal charge read operation is not carried out.

3. The amplification type solid-state imaging device as claimed in claim 1, wherein
the photoelectric transducer is a buried type photodiode.

4. The amplification type solid-state imaging device as claimed in claim 1, wherein
the switched capacitor amplifier portion has a boosting capacitance element that has one terminal connected to the output side of each transfer transistor of the photoelectric conversion and transfer portion group, and
the control section controls a voltage of the other terminal of the boosting capacitance element so that a voltage on the output side of each transfer transistor of the photoelectric conversion and transfer portion group is deepened when the signal charge is transferred from the photoelectric transducer to the signal charge storage portion of the switched capacitor amplifier portion via the transfer transistor.

5. The amplification type solid-state imaging device as claimed in claim 1, wherein
the power source side load that constitutes the inverting amplifier is a constant current load transistor or a resistor.

6. The amplification type solid-state imaging device as claimed in claim 1, wherein
the transfer transistor is a depletion type transistor, and
a potential under a gate of the transfer transistor in an OFF-state is shallower than a voltage of the constant voltage portion.

7. The amplification type solid-state imaging device as claimed in claim 6, wherein
the control section controls the input side voltage of the inverting amplifier by switching the power source side load connected to the signal line to the constant voltage portion and turning on the reset transistor of the switched capacitor amplifier portion by controlling the switchover portion during a period in which signal charge read operation is not carried out.

8. The amplification type solid-state imaging device as claimed in claim 6, wherein
the photoelectric transducer is a buried type photodiode.

9. The amplification type solid-state imaging device as claimed in claim 6, wherein
the switched capacitor amplifier portion has a boosting capacitance element that has one terminal connected to the output side of each transfer transistor of the photoelectric conversion and transfer portion group, and
the control section controls a voltage of the other terminal of the boosting capacitance element so that a voltage on the output side of each transfer transistor of the photoelectric conversion and transfer portion group is deepened when the signal charge is transferred from the photoelectric transducer to the signal charge storage portion of the switched capacitor amplifier portion via the transfer transistor.

* * * * *